Patented Jan. 26, 1926.

1,570,858

UNITED STATES PATENT OFFICE.

WALTER GEORGE PERKINS, OF LONDON, ENGLAND, ASSIGNOR TO METALS PRODUCTION COMPANY OF NORTH AMERICA, INCORPORATED, OF NEW YORK, N. Y., A CORPORATION.

LEACHING PROCESS FOR THE EXTRACTION OF METALS.

No Drawing.      Application filed July 25, 1925. Serial No. 46,167.

*To all whom it may concern:*

Be it known that I, WALTER GEORGE PERKINS, a subject of the King of England, residing at London, England, have invented certain new and useful Improvements in Leaching Processes for the Extraction of Metals, of which the following is a specification.

This invention comprises improvements in or relating to leaching processes for the extraction of metals from their ores and the like.

The invention has been developed primarily in relation to the treatment of oxidized ores of copper but is applicable also to the treatment of zinc ores and broadly speaking, to all cases where ammoniacal leaching solutions are employed. Under the term "ores" are included both leachable material obtained direct from the mine and also such material after it has undergone various forms of concentration or heat treatment or other processes to fit it for dissolution in ammonia.

It has long been known that ores of copper containing only copper carbonate can be effectively leached by an aqueous solution of ammonia; such a process has been successfully operated at the Kennecott mine, in Alaska. Ammonia by itself will not dissolve metallic copper or copper oxide; to effect the solution of these substances, a salt of ammonia such as the carbonate or sulphate must be added (see for example, "Metallurgy", by John Percy, published in London 1861, page 243). It is known that solution is accelerated by gentle heating (Percy, "Metallurgy", pages 601 and 604) and by combined heating and agitation (Austin, "Mines and methods", Salt Lake City, November 1911). The condensation of a mixture of ammonia vapour and steam on an ore containing oxidized copper, so as to form a hot ammoniacal leaching solution, was proposed at an early date (Berg und Hüttenmännische Zeitung, page 230, 1862). It is also known that an aqueous solution of ammonium-copper carbonate is decomposed by heat, the evolution of carbon dioxide commencing at about 54° C., while ammonia is evolved at 71–77° C. ("Chemical and Metallurgical Engineering", vol. 20. No. 7, page 332, 1919). When the $NH_3$ and $CO_2$ have been driven off by heating the copper-bearing solution, the copper is deposited as insoluble copper-oxide.

In the early application of ammonia leaching to the recovery of copper from oxidized ores and the like, serious difficulties were encountered in separating the leaching solution containing the dissolved copper from the insoluble residues of the ore. It was found that, even after repeated washings with hot or cold water, the residues contained an appreciable amount of ammonia and copper, and it was concluded that an ammonium-copper compound is adsorbed on the insoluble residues of the ore. A method of overcoming the difficulty was disclosed by Stannard, U. S. Patent No. 1,238,951, and used at the Kennecott mine. After the ore had been leached with an 8% solution of ammonia in closed vessels, the copper-bearing solution was removed as far as possible by drainage and washing with water, and then steam under pressure was admitted to the space above the solid residues in the leaching vessel. Upon contact with the residues, the steam condensed so long as the residues remained cold, the water produced flowing downwardly through the charge, partly by gravity and partly under the pressure of the steam, thus providing a hot aqueous wash to remove the dissolved copper and some of the ammonia from the residues. Subsequently, in such a process the live steam itself penetrates the charge and substantially completes the removal of the ammonia from the residues.

Another method of overcoming the same difficulty was disclosed by Benedict in U. S. Patent No. 1,355,474, and is used at the Calumet & Hecla mine, Michigan. In this case the ore contains only native copper in the proportion of about 0.7%, and as can be seen from U. S. Patent No. 1,131,986 it is necessary to use a dilute solution containing about 1% $NH_3$, 0.8% $CO_2$, and 0.5% Cu. for the first leaching operation. Subsequently the ore is washed with a similar solution except that it contains 0.35% Cu., while a final wash is carried out with a solution containing 0.01% Cu., 0.08% $NH_3$ and 0.02% $CO_2$. It is necessary to aerate the leaching solution, since it owes its solvent properties to the presence of cupric-ammonium carbonate, which can dissolve copper so as to form the corresponding cuprous salt of copper. The residues are then drained by exhausting the air from a space beneath them. Next, steam is admitted, at substantially atmospheric pressure, to the space above the charge, and is sucked downwards into the exhausted space below the charge. Finally, the steam is cut off and hot water is poured on to the charge; the heat of the residues causes the water to evaporate under the diminished pressure that is maintained, and the resulting steam removes the last traces of ammonia from the residues.

In carrying out such processes one difficulty which may arise is due to the fact that heating of a cupric ammonium solution causes evaporation of the contained carbon dioxide and ammonia and precipitation of the dissolved copper. When steam is applied to the ore some or all of the carbon dioxide and ammonia in the solution which remains in contact with the ore either in its pores or upon the surfaces thereof is evaporated with the result that the copper content may be precipitated. Precipitation may take place either as oxide or as basic carbonate of copper or generally as a mixture of the two. This difficulty was apparently considered unimportant by both Stannard and Benedict. The loss of copper may not be very great but it is sufficient to give value to a method which eliminates the loss.

According to the present invention in a process for the leaching of ores and the like by ammoniacal solutions there is applied to the ore, following upon the solutions, a previously effected admixture of vapors consisting of steam and ammonia with or without carbon dioxide. It is found that the presence of the ammonia, assisted if necessary with carbon dioxide, prevents such re-precipitation of copper as is above described.

It is moreover found that in certain cases the employment of mixed vapours of steam, ammonia and carbon dioxide is useful for effecting part or all of the leaching operation itself and in this connection the presence of the carbon dioxide tends to prevent such loss of ammonia as is indicated in the experiments above referred to published in the Berg und Hüttenmännische Zeitung.

Accordingly the invention includes in a process for the leaching of ores and the like the step which consists in passing through a body of the ore vapors consisting of a previously effected admixture of steam, ammonia vapour and carbon dioxide.

When the ammonia and carbonic acid are recovered from the solution separated from the ore after the leaching operation by boiling out the liquors (the copper being thereby precipitated) the mixed vapors of steam, ammonia and carbon dioxide which are given off in the boiling out step may be led into contact with a charge of the material after passage of the solvent therethrough, so that the vapours are there condensed. The vapours are therefore utilized for the same purpose as that above set forth i. e. for washing out the remaining traces of copper-bearing solvent from the ore without causing re-precipitation of the copper on the ore and without leaving substantial amounts of ammonia in the tailings. The provision of a separate condenser for the recovery of the boiled-out vapours, and of separate means for producing the mixed vapours, are avoided. If necessary, however, carbon dioxide may be added to the vapours derived from boiling out the copper-bearing liquor produced in the leaching operation.

Preferably the liquid formed by the condensation of the vapours on the leached ore charge is collected and used to form the leaching liquor for a fresh charge of ore.

The invention is particularly advantageous in the treatment of materials such as the product of the processes disclosed in U. S. specifications Nos. 1,440,186 and 1,509,774.

In these cases the ore may contain chrysocolla and other oxidized copper compounds that are not soluble in ammoniacal solutions. The ore, in a coarsely ground condition, is first heated to about 400° C. in order to dehydrate it, and is then heated to about 340° C. in the presence of a reducing gas. As a result, the copper silicate is reduced to a form which is readily soluble in a cupric-ammonium carbonate solution; since the reduced material is highly porous, the ore need not be crushed finely. If the ore to be treated contains copper in the form of sulphide, it can be prepared for leaching by a preliminary oxidizing roast (at 400–500° C.), which converts the sulphides into sulphates, followed by heating in a reducing atmosphere at 300° C.–355° C. (U. S. specification No. 1,509,774).

The ammoniacal solution containing the copper leached from the charge is drained away, and the residues may be washed with water or preferably with a fairly strong solution of ammonia initially free from copper. In any case, a final steam treatment is desirable and this may be applied either by forcing steam under pressure through the residues, or sucking the steam through the residues into a partially exhausted space below them. Owing to the porosity of the material the difficulty of re-precipitation of the copper above referred to is accentuated, and this is still more the case when the material is coarse. The copper may be deposited as a crust of insoluble basic copper carbonate and copper oxide on the external surfaces of the particles of the residues.

Accordingly the invention includes a process for the leaching of copper ores rendered porous by heating (for example ores treated as described in U. S. Patents Nos. 1,440,186 and 1,509,774) wherein the ore is subjected to the solvent action of ammoniacal carbonate solutions, and is thereafter treated with a previously effected admixture of vapors consisting of steam and ammonia with or without carbon dioxide.

*Example I.*

The following is one example of carrying the invention into effect described with reference to a complete process for the treatment of the ore in which the various reagents are, as far as possible, used cyclically.

The ore is first heat-treated in accordance with the prior patents hereinabove referred to at a temperature of 300°–500° C. in a rotary furnace, by the aid of a reducing gas led through the furnace. The reducing gas consisting of a mixture of carbon monoxide and volatile hydrocarbons is produced by heating coal in a producer furnace and ammonia is obtained by scrubbing the producer gases by well known methods before employing them in the heat treatment of the ore. By this means the ammonia can be obtained in the form of an aqueous solution containing 0.8% $NH_3$ and it is found that the amount of ammonia so obtained is sufficient to replace the ammonia unavoidably lost in the various leaching operations.

After the heating step the ore is cooled and introduced into leaching tanks and leached. However, instead of employing steam for the final removal of the ammonia from the ore a mixture of steam, ammonia vapour and carbon dioxide is introduced into the leaching tanks above the charge either before or after the leaching liquor has been removed by drainage.

The mixed vapours are obtained by evaporating the above described solution of ammonia obtained from the scrubbers of the producer, and introducing into it carbon dioxide which may be derived from the gases finally discharged from the heating furnace. In order to obtain this carbon dioxide these gases may be burnt separately if necessary. The heat employed in burning them may be used in various ways, either for heating the furnace in which the ore is treated, for evaporating the ammonia solution obtained from the scrubbers, for boiling out the leaching solutions or otherwise.

When the mixed vapours are introduced above the ore the leaching liquor in the ore is gradually withdrawn and the vapors follow it downwardly so that they are brought into progressive contact with the ore. The condensation of the vapors upon the ore particles produces an ammonium carbonate solution which tends to assist dissolution of the copper rather than to cause precipitation thereof, and the quantity of ammoniacal solution thus in contact with the ore effectually prevents the formation of the aforesaid crusts of basic carbonate or oxide. The presence of the carbon dioxide is necessary if there is any undissolved copper present in the ore before the application of the steam in order to enable the steam and ammonia to carry such undissolved copper into solution. The ammonia by itself may suffice to prevent reprecipitation.

The effluent liquors from the leaching operations are collected and heated to evaporate ammonia and carbon dioxide with the result that the copper from the ore is recovered as a precipitate of copper oxide.

*Example II.*

An alternative method of obtaining the desired mixed vapours for the final operation in the leaching tanks is to use some or all of the vapours evolved during the final distillation of these leaching liquors.

Ore from the Bwana M'Kubwa mine, Northern Rhodesia was used. The ore, containing 4.8% Cu., mostly in the form of malachite, was ground to pass a screen having 10 meshes to the lineal inch, and heated in a reducing atmosphere as above described. 9,000 grammes of the reduced ore were placed in a closed vessel and damped with 500 cubic centimetres of water, after which 10,000 cubic centimetres of an aqueous solution containing 1% Cu., 5% $NH_3$ and 4% $CO_2$ was introduced into the charge by upward displacement.

The solution was sufficient in quantity to fill the voids between the ore particles and to leave some excess above the surface in the vessel containing it. The solution was kept in continuous circulation by withdrawing it from the bottom of the charge, raising it by an air-lift and returning it to the top of the charge, and allowing it to percolate downwards therethrough.

Extraction was completed in 24 hours, at the end of which time the solution was drained as far as possible from the solid material, which retained a quantity of solution amounting to 20% of the weight of the solid. The solution drained from the material carried 4.84% Cu.; it was then placed in a metal drum, and steam was passed through it to raise the temperature of the solution. A mixture of steam, ammonia and carbon-dioxide was given off and was passed into the top of a closed vessel containing the solid residues from the leaching operation, and a reduced pressure was produced in the lower part of the vessel by means of an exhaust pump; the vapour exhausted from the vessel was passed through a condenser to prevent loss of ammonia. In operations on a large scale such a condenser might be unnecessary or if needed it would be much smaller than a condenser for the whole of the boiled out vapours. The liquid condensed on the solid material was withdrawn at intervals and tested for copper. After 5½ hours the supply of vapor was cut off and clean steam was substituted; after a further 6 hours the steam exhausted from the vessel was found to be free from ammonia, and the process was terminated. The residues were found to contain 0.28% Cu., while their ammonia content amounted only to 0.39 lb. $NH_3$ per ton of solid residues. The extraction of copper amounted to 94.5% of the values in the ore.

What I claim as my invention and desire to secure by Letters Patent is:—

1. In a process for the leaching of ores and like materials by ammoniacal solutions, the application to the ore, following upon the solutions, of a previously effected admixture of vapours comprising steam and ammonia.

2. In a process for the leaching of ores and like materials by ammoniacal solutions, the application to the ore, following upon the solutions, of a previously effected admixture of vapours consisting of steam, ammonia and carbon dioxide.

3. In a process for the leaching of ores and like materials, the step which consists in passing through a body of the ore vapours consisting of a previously effected admixture of steam, ammonia-vapour and carbon dioxide.

4. In a leaching process for ores and like materials the combination of leaching the ore in a body by percolation with an ammoniacal solution, thereafter introducing above the ore a previously effected admixture of vapours of steam and ammonia, and bringing these vapours into progressive contact with the ore by causing gradual withdrawal of the liquor.

5. In a leaching process for ores and like materials the combination of leaching the ore in a body by percolation with an ammonical solution, thereafter introducing above the ore a previously effected admixture of vapours of steam and ammonia, bringing these vapours into progressive contact with the ore by causing gradual withdrawal of the liquor, collecting the liquor condensed in the charge from the vapours separately from the leaching liquors, and making up fresh quantities of solution from said condensed liquor.

6. In a process for the leaching by ammoniacal solutions of ores and like materials containing oxidized copper the application to the ore, following upon the solutions, of a previously effected admixture of vapours comprising steam and ammonia.

7. In a process for the leaching by ammoniacal solutions of ores and like materials containing oxidized copper the application to the ore, following upon the solutions, of a previously effected admixture of vapours consisting of steam, ammonia and carbon dioxide.

8. In a process for the leaching of ores and like materials containing oxidized copper, the step which consists in passing through a body of the ore vapours consisting of a previously effected admixture of steam, ammonia-vapour and carbon dioxide.

9. In a leaching process for ores and like materials containing oxidized copper the combination of leaching the ore in a body by percolation and with an ammoniacal solution, thereafter introducing above the ore a previously effected admixture of vapours of steam and ammonia, and bringing these vapours into progressive contact with the ore by causing gradual withdrawal of the liquor.

10. In a leaching process for ores and like materials containing oxidized copper the combination of leaching the ore in a body by percolation with an ammoniacal solution, thereafter introducing above the ore a previously effected admixture of vapours of steam and ammonia, bringing these vapours into progressive contact with the ore by causing gradual withdrawal of the liquor, collecting the liquor condensed in the charge from the vapours separately from the leaching liquors, and making up fresh quantities of solution from said condensed liquors.

11. A process for the leaching of copper ores rendered porous by heating wherein the ore is subjected to the solvent action of ammoniacal carbonate solutions, and is thereafter treated with a previously effected admixture of vapours comprising steam and ammonia.

12. A process for the leaching of copper ores rendered porous by heating wherein the ore is subjected to the solvent action of ammoniacal carbonate solutions, and is thereafter treated with a previously effected admixture of vapours comprising steam, ammonia and carbon dioxide.

13. In a process for the extraction of copper from oxidized copper ores of the kind described, the combination of heating the material in a reducing atmosphere for such a short time and at such a low temperature as to reduce the copper compound without melting or alloying the copper and without fritting the gangue and so that the reduced material is obtained in a porous condition, thereafter submitting the material to the solvent action of ammoniacal carbonate solutions thereafter treating it with a previously effected admixture of vapours comprising steam and ammonia, and extracting the copper from the resultant solutions.

14. In a process for the extraction of copper from oxidized copper ores of the kind described, the combination of heating the material in a reducing atmosphere for such a short time and at such a low temperature as to reduce the copper compound without melting or alloying the copper and without fritting the gangue and so that the reduced material is obtained in a porous condition, thereafter submitting the material to the solvent action of ammoniacal carbonate solutions thereafter treating it with a previously effected admixture of vapours consisting of steam, ammonia and carbon dioxide.

In testimony whereof I affix my signature.

WALTER GEORGE PERKINS.